(12) United States Patent
Guyon et al.

(10) Patent No.: US 11,667,185 B2
(45) Date of Patent: Jun. 6, 2023

(54) DEVICE FOR VENTILATING A VEHICLE

(71) Applicant: Flex-N-Gate France, Audincourt (FR)

(72) Inventors: Cyrille Guyon, Nommay (FR); Joaquin Hung, Markham (CA)

(73) Assignee: Flex-N-Gate France, Audincourt (FR)

( * ) Notice: Subject to any disclaimer, the term of this patent is extended or adjusted under 35 U.S.C. 154(b) by 476 days.

(21) Appl. No.: 16/795,801

(22) Filed: Feb. 20, 2020

(65) Prior Publication Data

US 2020/0269679 A1 Aug. 27, 2020

(30) Foreign Application Priority Data

Feb. 26, 2019 (FR) ...................................... 19 01970

(51) Int. Cl.
*B60H 1/24* (2006.01)
*B60K 11/08* (2006.01)
(52) U.S. Cl.
CPC ............ *B60K 11/085* (2013.01); *B60H 1/242* (2013.01)
(58) Field of Classification Search
CPC ....... B60K 11/085; B60H 1/242; Y02T 10/88; B60R 19/03
USPC ...................................................... 180/68.1
See application file for complete search history.

(56) References Cited

U.S. PATENT DOCUMENTS

| | | | | |
|---|---|---|---|---|
| 5,090,445 A * | 2/1992 | Jackson | ................... | F23L 13/02 137/527.8 |
| 5,735,137 A * | 4/1998 | Kim | ..................... | F24F 13/075 454/351 |
| 8,505,660 B2 * | 8/2013 | Fenchak | .............. | B60K 11/085 180/68.1 |
| 10,029,558 B2 * | 7/2018 | Frayer, III | .......... | B60K 11/085 |
| 10,479,167 B2 * | 11/2019 | Hegedusch | .......... | B60K 11/085 |
| 2014/0273806 A1 * | 9/2014 | Frayer, III | .......... | B60K 11/085 454/335 |

(Continued)

FOREIGN PATENT DOCUMENTS

| | | | | |
|---|---|---|---|---|
| DE | 19742730 A1 * | 4/1998 | .......... | B60K 11/085 |
| DE | 102012000173 A1 | 7/2013 | | |

(Continued)

OTHER PUBLICATIONS

JP_2003106044_A_1_English Translation, see Foreign Patent Documents, patent referenced from 2003.*

(Continued)

*Primary Examiner* — Steven S Anderson, II
*Assistant Examiner* — Andrew W Cheung
(74) *Attorney, Agent, or Firm* — Reising Ethington P.C.

(57) ABSTRACT

A ventilating device for ventilating a vehicle includes a frame defining an opening and a closing device including at least one closing flap extending in a general direction in the opening. The closing device is movable between open and closed positions such that a passage surface for the air through the ventilating device is smaller than the passage surface for the air when the closing device is in the open position. The flap is movable between open and closed positions and is mounted pivotably on the frame in order to pivot between the open and closed positions. The closing device includes a guide system for guiding the flap, which is arranged between two ends of the flap and includes a guide slot and a pin moving in the guide slot between the open and closed positions.

20 Claims, 6 Drawing Sheets

(56) References Cited

U.S. PATENT DOCUMENTS

2017/0106741 A1\* 4/2017 Shaw .................. B60K 11/085
2017/0326970 A1\* 11/2017 Schoening ........... B60K 11/085

FOREIGN PATENT DOCUMENTS

| EP | 3552887 A1 \* | 10/2019 | ............ B60K 11/08 |
|----|---------------|---------|-------------------------|
| FR | 2404557 A1 | 4/1979 | |
| FR | 2754013 A1 | 4/1998 | |
| FR | 2825326 A1 | 12/2002 | |
| FR | 3048646 A1 | 9/2017 | |
| JP | 2003106044 A \* | 4/2003 | .............. E05F 15/63 |
| JP | 2012224101 A | 11/2012 | |
| WO | WO-2007130847 A2 \* | 11/2007 | ........... B60K 11/085 |

OTHER PUBLICATIONS

DE_19742730_A1 English Translation, see Foreign Patent Documents, patent referenced from 1998.\*
French Search Report corresponding to French application No. FR 1901970, dated Nov. 22, 2019, 2 pages.

\* cited by examiner

DEVICE FOR VENTILATING A VEHICLE

This patent application claims the benefit of French Patent Application No. FR 19 01970 filed on Feb. 26, 2019, which is hereby incorporated by reference.

TECHNICAL FIELD

The present disclosure relates to a ventilating device for ventilating a vehicle and more specifically relates to a ventilating device configured to manage air flows of a motor vehicle.

BACKGROUND

Ventilating devices may for example be arranged at the front of a vehicle and be part of the grille of the vehicle. Such a ventilating device makes it possible to manage an incoming air flow configured to be in contact with the cooling system of the engine and makes it possible to keep the engine at the optimal operating temperature. Such a device advantageously makes it possible to combine a high-performing aerodynamic shape of the vehicle and an optimal operating temperature of the engine.

These ventilating devices are most often hidden behind grates or grilles.

Closing devices of these ventilating devices can raise problems of stiffness, in particular in the case of large closing flaps, that is to say, flaps having a length greater than or equal to 350 millimeters (mm).

Furthermore, when these closing devices are visible from outside the vehicle, the risk of bending of the closing devices becomes high due to the pressure of the air, which becomes very substantial on the closing device.

Indeed, for such very large flaps and/or when the flaps are exposed to the pressure from the air, problems of jamming of the rotational movement between their open and closed positions may occur. As a result, such flaps often do not have optimal kinematics between their open position and their closed position.

To address these problems, it has been proposed to provide several separate closing devices having shorter flaps extending in the continuity of one another and each having a system for setting the flaps in rotation. The choice in the size and shape of the flaps is therefore limited.

These closing devices are relatively bulky, complex to make and mount on the vehicle due to the multiplicity of parts involved in the manufacturing of these devices.

Furthermore, these closing devices can harm the aesthetics of the vehicle, the transition between the adjacent flaps being visible, in particular when the latter are visible from an outside of the vehicle while the desire of automobile builders is to adapt the grille to the style of the vehicle so that the latter is best and most aesthetically incorporated into the architecture of the vehicle.

Other closing devices may include flaps and pivot systems comprising a pivot shaft support that couples the flap to the pivot axis of the flap, the pivot shaft pivoting along the pivot axis of the flap. Such a support part has a substantial length depending on the deflection in the area where the pivot link is located so that the pivot shaft is located on the pivot axis of the flap.

These closing devices raise issues of interference of the flaps and support parts in the open position of the flaps, but also during the change of position between the open position and the closed position. Indeed, when the flaps are in the open position, the part of the flap furthest from the pivot axis, for example the central area of the flap, can interfere with the shaft support part of an adjacent flap. As a result, certain flaps cannot open completely, in other words, reach their open position.

SUMMARY

The following disclosure aims to address one or more of these or other drawbacks by proposing an improved ventilating device. This system can advantageously be used to manage the temperature of the engine of the vehicle, but it can also be used to manage the aerodynamics of the vehicle.

Embodiments of a ventilating device comprise a frame defining an opening and a closing device comprising at least one closing flap extending in a general direction in the opening, the closing device being movable between an open position and a closed position such that a passage surface for the air through the ventilating device is smaller than the passage surface for the air when the closing device is in the open position, the flap being movable between an open position when the closing device is in the open position and a closed position when the closing device is in the closed position, the closing flap being mounted pivoting at each of its ends on the frame along a pivot axis substantially parallel to said general direction in order to pivot the closing flap between the open position and the closed position.

Embodiments of the invention relate to a ventilating device of the aforementioned type, in which the closing device further comprises a system for guiding the closing flap arranged between the two ends of the closing flap, the guide system comprising a guide slot and a pin moving in the guide slot between the open position and the closed position.

The guide system makes it possible to stiffen the entire closing device, since the guide system procures an additional bearing point on the frame.

Thus, the guide system makes it possible to avoid the jamming of the closing device. In particular, the kinematics of the closing device are secured because the guide system allows a different kinematic relative to the pivot link and which accompanies the movement of the closing device.

Owing to embodiments of the invention, it is possible to reduce the number of flaps.

The control of the closing device is therefore made easier.

Additionally, the ventilating system is secured due to the use of at least two different rotation systems, namely the pivoting and the guided movement of the pin in the guide slot.

Furthermore, the closing device allows greater freedom in the choice of the shape of the flap while containing the bulk necessary for the rotation of the closing flaps.

Thus, the closing device can adapt to the style of the vehicle more simply.

The closing device is compact and makes it possible to be integrated into a limited available volume. This contributes to the integration of the ventilating device into different types of vehicles.

According to various embodiments, the ventilating device further comprises one or more of the following features in any technically feasible combination:
- the closing flap has a curved shape;
- the closing flap has an area of maximum deflection, the guide system being arranged in said area of maximum deflection of the closing flap;
- the guide slot has a curved shape, in particular a concave shape;

the guide system comprises a support, the pin being fastened to one among the closing flap or the support and the guide slot being arranged in the other among the support or the closing flap;

the support has a weak area such that said area is fusible in case of impact with an element outside the vehicle, such as a pedestrian;

the pin extends along a direction substantially perpendicular to the pivot axis;

the pin extends along a direction parallel to the pivot axis;

each end of the guide slot defines an opening stop and a closing stop of the closing flap, the pin being arranged against the opening stop when the closing flap is in the open position and the pin being arranged against the closing stop when the closing flap is in the closed position;

the closing device comprises a plurality of flaps and wherein at least two guide slots of the guide system of said closing flaps are different from one another;

for each closing flap, each end of the guide slot respectively defines an opening stop and a closing stop of the closing flap, the pin being arranged against the opening stop when the closing flap is in the open position and the pin being arranged against the closing stop when the closing flap is in the closed position, the shape of the guide slot and/or the position of the closing stop and/or the position of the opening stop depending on a maximum deflection of the closing flap.

The following guide system can be made more compact than the pivot system with shaft support part, such that the dimensions of the parts of the guide system arranged between the flaps are smaller and, as a result, make it possible to avoid interference of the flaps with one another compared with a pivot link around a pivot shaft that must be located on the pivot axis. Thus, the flaps can reach their open position.

Other aspects and advantages of the will appear upon reading the following description, provided as an example and with reference to the appended drawings, in which:

DETAILED DESCRIPTION

Figure 1:
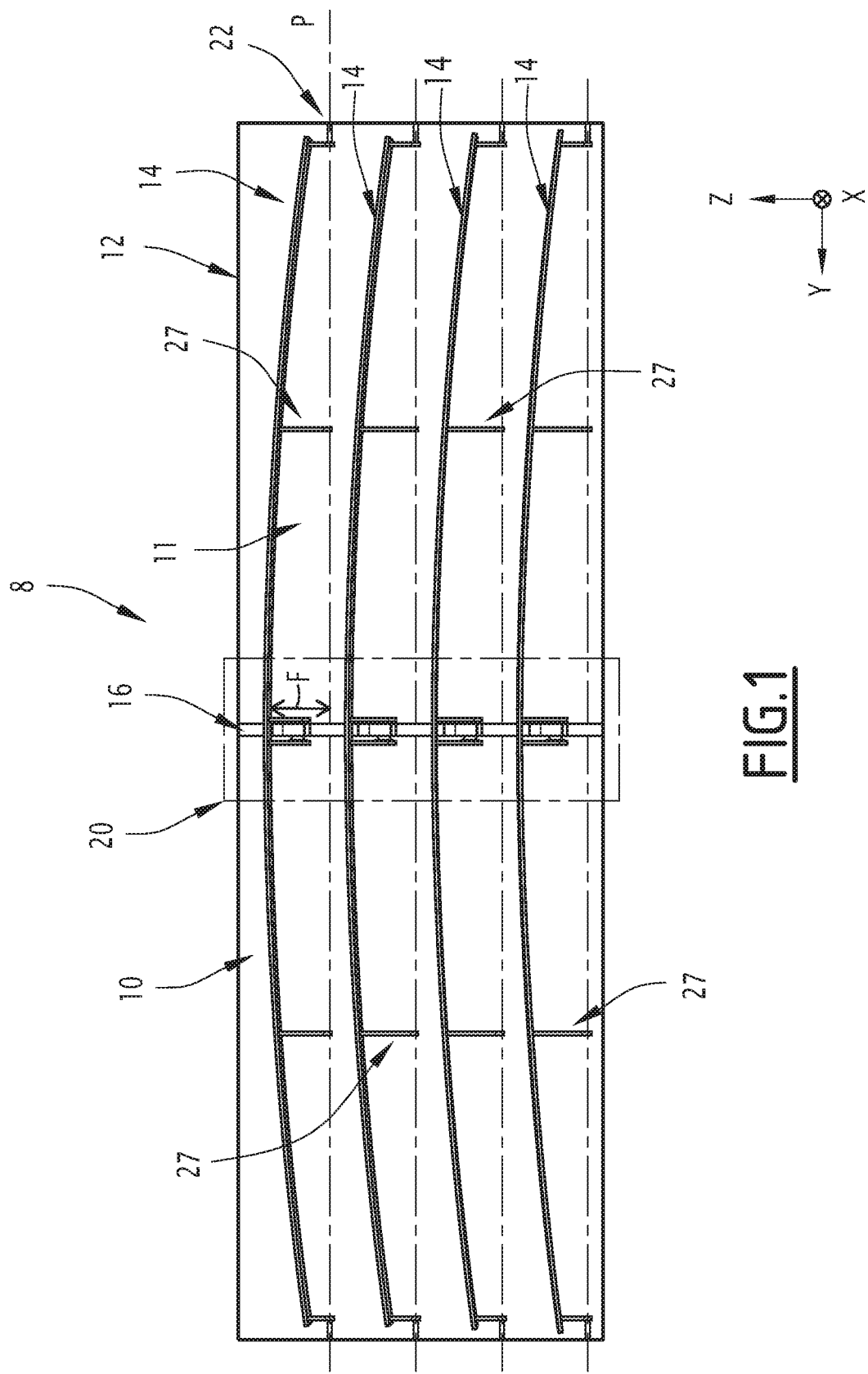
FIG. 1 is a front view of a part of the ventilating device according to an embodiment of the invention.

FIGS. 1 to 4 show a first embodiment of the ventilating device 8.

The ventilating device 8 is for example configured to be part of a grille of a vehicle in order to allow an intake of outside air to cool a cooling device of the vehicle through an air inlet opening.

The aim is to combine the aerodynamic performance when the ventilating device is closed and the management of the engine temperature by opening the ventilating device as needed and cooling the engine or any other system requiring thermal management.

A first direction X is defined. In the present example, the first direction is parallel to a front-back axis of the vehicle. The first direction is denoted "first direction X".

In the present description, a second direction is also defined that is parallel to the axles of the vehicle. The second direction is denoted "second direction Y" and thus corresponds to the width of the vehicle.

Lastly, a third direction is also defined, perpendicular to the first direction X and the second direction Y. In the present example, the third direction corresponds to the height of the vehicle. The third direction is denoted "third direction Z".

The ventilating device 8 comprises a closing system 10 and a frame 12.

The frame 12 defines the air inlet opening 11 into the vehicle.

According to one embodiment, the frame 12 is formed by the bumper.

Thus, the opening 11 is for example formed in a bumper skin of the vehicle.

In a variant, the frame 12 is formed by a module of the vehicle and/or by a part configured to be mounted on the vehicle.

The closing device 10 comprises at least one closing flap 14 and, for each closing flap 14, a guide system 16 of the closing flap. In the remainder of the disclosure, the closing flap 14 can be called "flap 14."

The closing device 10 has an open position (visible in FIGS. 1 and 2), in which the opening 11 is at least partially open such that a flow of air can circulate through the opening 11, for example in the first direction X when the closing device 10 is mounted on the vehicle, and a closed position (visible in FIG. 3), in which the closing device 10 at least partially closes the opening 11.

An air passage surface is defined through the ventilating device 8 delimited between the frame 12 and the closing device 10. When the closing device 10 is in the closed position, the air passage surface is smaller than the air passage surface when the closing device 10 is in the open position.

According to one embodiment, the air flow is completely interrupted when the closing device is in the closed position.

In the present exemplary embodiment, the closing device 10 comprises a plurality of closing flaps 14.

For example, the closing device 10 comprises a number of flaps of between 2 and 20, inclusive.

Each closing flap 14 has a general direction parallel to the second direction Y.

Each closing flap 14 has a first end 14A and a second end 14B extending along the second direction Y.

The closing flaps 14 extend along the second direction Y in the opening 11. The closing flaps 14 are then positioned above one another in the third direction Z.

Each closing flap 14 is movable between an open position when the closing device 10 is in the open position and a closed position when the closing device 10 is in the closed position. The closing flaps 14 are rotatable between the open position and the closed position around a pivot axis P.

The pivot axis P of each flap 14 is, in this example, substantially parallel to the second direction Y.

In a variant, the pivot axis P of at least one flap 14 forms a non-zero angle with the second direction Y, the first direction X and/or the third direction Z.

A rotation angle is defined for the closing flaps 14 between the open position and the closed position around the pivot axis P.

For example, the rotation angle is substantially equal to 90°.

In the closed position, a face 14C of the flaps 14 is oriented against the direction of the air flow. This advantageously makes it possible to improve the drag coefficient Cx of the vehicle in the closed position.

Furthermore, in the closed position, the set of flaps 14 defines an outer surface 18 of the closing device 10, also called "outer skin". The outer skin for example extends in the continuity of the outer surface of the part of the vehicle on which the closing device 10 is mounted so as to offer a satisfactory aesthetic of the closing device 10 and its environment.

"Outer part" refers to a part of the ventilating device 10 oriented toward the outside of the vehicle as opposed to an "inner part", which is a part of the closing device 10 oriented toward the inside of the vehicle.

In the present example, each closing flap 14 is made in a single part.

In a variant, each closing flap 14 can comprise several parts, for example two parts or three parts.

In the case where the flaps 14 comprise more than one part, the different parts of the flap 14 extend in the continuity of one another along the second direction Y and the different parts of the flap 14 are secured in movement, that is to say, they move together between the open position and the closed position.

For example, the flaps 14 are made from a polymer.

In a variant, the flaps 14 are made from metal.

Figure 2:
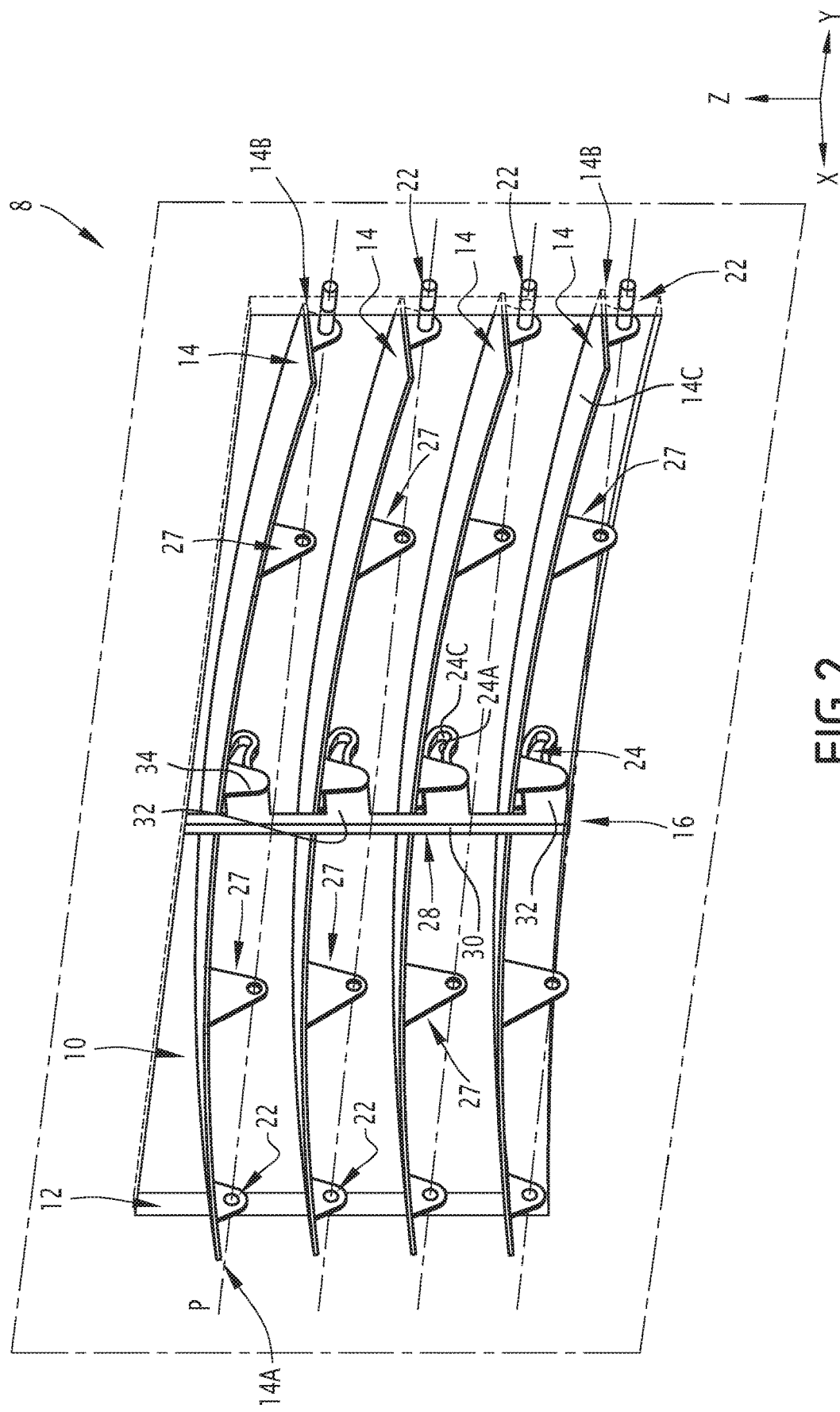
FIG. 2 is a perspective and schematic illustration of the ventilating device in an open position according to one embodiment.
Figure 3:
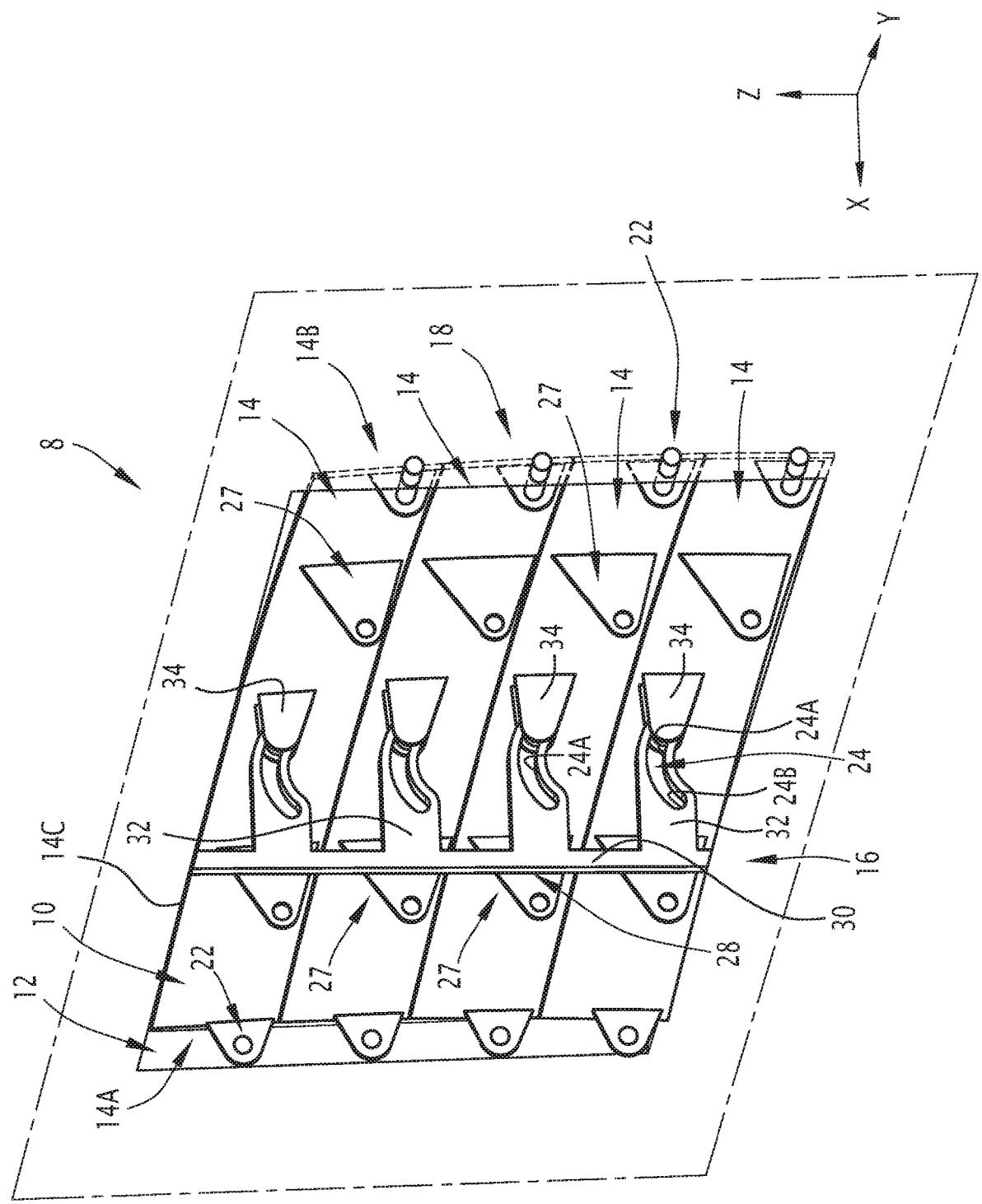
FIG. 3 is an illustration of the ventilating device of FIG. 2 in a closed position.
Figure 4:
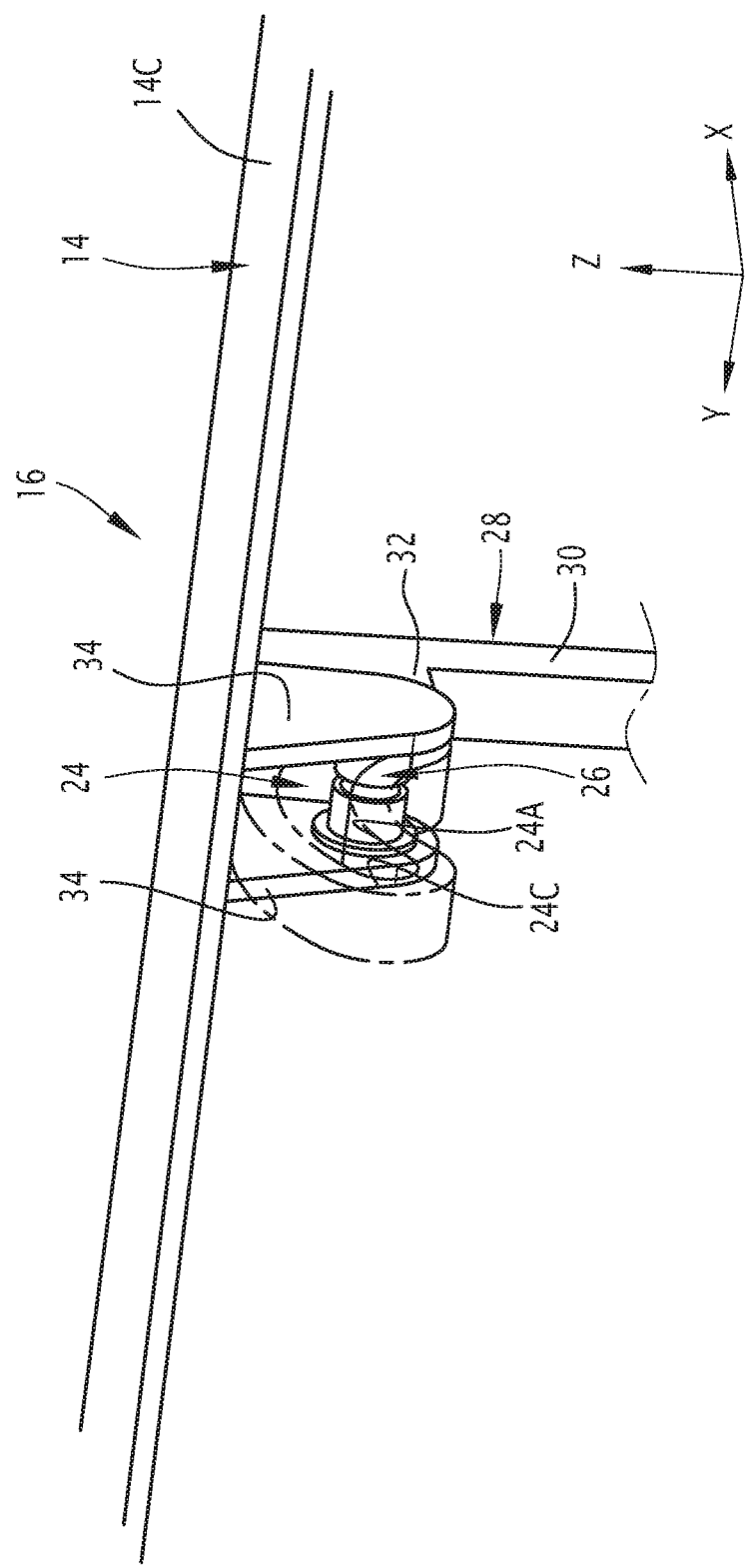
FIG. 4 is a detail view of a guide system of the ventilating device of FIGS. 1-3.

According to the embodiment shown in the figures and as more specifically shown in FIGS. 1 to 3, the closing flaps 14 have a curved shape.

More specifically, in cross-section, in a section plane normal to the second direction Y when the closing flaps 14 are in the open position, the closing flaps 14 have a curved shape. For example, the flaps 14 are in the shape of an arc or have a concave shape.

Furthermore, as shown in FIG. 1, the closing flaps 14 for example have, in cross-section, in a section plane normal to the first direction X when the flaps 14 are in the open position, a curved shape. For example, the flaps 14 have an arc shape or a concave shape. In still other words, the flaps 14 are curved along the second direction Y. Thus, in the present embodiment, from one end to the other of each flap 14 along the second direction Y when this flap 14 is in the open position, this flap 14 has a curved shape.

Each flap 14 has an area of maximum deflection 20.

The deflection F of FIG. 1 is the distance between the pivot axis P of the flap 14 and a face of the flap 14. The arrow F is shown in FIG. 1.

The area of maximum deflection 20 corresponds to the area of the flap 14 where a tangent to the closing flap 14 parallel to the pivot axis P of the flap 14 passes.

For each closing flap 14, the area of maximum deflection 20 comprises the maximum deflection of the flap 14 and is for example located in a central portion of the flap 14.

For example, the maximum deflection F is between 150 millimeters (mm) and 200 mm, inclusive.

Furthermore, for example, the curve radius of the flap 14 is between three meters and four meters, inclusive. As a specific example, the flaps 14 have a curve radius equal to four meters.

In the present application, if a value is between values A and B, inclusive, this means that the value is greater than or equal to A and less than or equal to B.

Furthermore, the flaps 14 are flaps with large dimensions.

A flap with large dimensions is a flap whose length is greater than or equal to 350 mm. The length of the flap refers to a dimension of the flap 14 measured between its two ends 14A, 14B along the second direction Y.

More generally, in the present disclosure, the length of a given element is the dimension of this given element measured along the second direction Y.

For example, the flaps have a length greater than or equal to 450 mm.

A flap with a large dimension can also be a flap whose width is greater than or equal to 50 mm while having a length greater than 450 mm, for example. The width of the flap 14 refers to a dimension of the flap 14 measured between an inner ridge of the flap 14 and an outer ridge of the flap 14 when the flaps 14 are in the open position.

As an illustration, the length of the closing flap 14 is between 900 mm and 1100 mm, inclusive.

In the present exemplary embodiment, all of the closing flaps 14 have the same length.

Each closing flap 14 is mounted pivoting on the frame 12 at each of its ends 14A, 14B along the pivot axis P.

For example, the flap 14 is mounted pivoting on the frame 12 by means of a pivot link 22.

For example, the flaps 14 are connected in rotation.

For example, the pivoting of one flap 14 causes the rotation of the other flaps 14.

For example, the flaps 14 are controllable flaps.

For example, the closing device 10 comprises a control module (not shown) of the flaps 14 configured to control the pivoting of the flaps 14 along the pivot axis P and, in particular, the pivot links 22. The guide system 16 is arranged between the two ends 14A, 14B of each closing flap 14.

The guide system 16 is arranged between the two ends 14A, 14B of each of the closing flaps 14.

The guide system 16 comprises, for each closing flap 14, a guide slot 24 and a pin 26 moving in the guide slot 24 when the closing flap 14 moves between the open position and the closed position. The guide system 16 further comprises a support 28.

The support 28 is for example fastened to the frame 12 at each of its ends.

In a variant, the support 28 is fastened on an additional part separate from the frame 12.

The pin 26 is fastened to the closing flap 14, and the guide slot 24 is arranged in the support 28, respectively in a part fastened to the flap 14.

The support 28 extends along the first direction X and along the third direction Z.

More specifically, the support 28 comprises an arm 30 extending along the third direction Z and, for each flap 14, a branch 32 protruding from the support 28 toward the outside of the vehicle along the first direction X.

The arm 30 is for example fastened by its ends to the frame 12.

For example, the branch 32 is integral with the arm 30.

In the present example of the guide system 16, for each closing flap 14, the guide slot 24 is arranged in the support 28, for example in a respective branch 32.

The guide slot 24 forms a through hole, for example along the second direction Y.

The guide slot 24 has a guide surface 24A on which the pin 26 slides during the movement of the flap 14.

In cross-section in a plane normal to the second direction Y, the guide slot 24 has a curved shape.

The curved shape is for example concave, the concave side facing the inside of the vehicle.

For example, the guide slot 24 has an arc of circle shape.

The curve of the guide slot 24 is for example a function of the curve of the closing flap 14.

The guide slot 24 defines an opening stop 24B and a closing stop 24C of the closing flap 14. The pin 26 is arranged against the opening stop when the flap 14 is in the open position and the pin 26 is arranged against the closing stop when the flap 14 is in the closed position.

The position of the opening stop 24B and/or the position of the closing stop 24C depend on at least one parameter selected from the list comprising: the desired rotation angle of the flap 14, the deflection of the opening flap 14, the position of the flap 14 along the first direction C, the position of the flap 14 along the third direction Z, the position of the support 28 along the second direction Y, the position of the guide slot 24 along the second direction Y, the desired shape of the outer skin, and the width of the closing flap 14.

In particular, a length of the guide slot 24 is defined as being the length of the guide surface 24A.

The length of the slot 24 depends on at least one parameter comprised in the list comprising: the rotation angle of the flap 14, the deflection of the flap 14, the length of the closing flap 14, the position of the pin 26 sliding in the guide slot 24, and the position of the guide slot 24 along the second direction Y.

For example, the pin 26 is fastened between two fastening tabs 34 protruding from a face of the flap 14 and extending across from the guide slot 24.

In the present example, the pin 26 comprises two parts facing one another along the second direction Y.

In a variant, the pin 26 is formed in one piece.

In a variant, the pin 26 is formed in one piece with the flap 14.

In still another variant, the pin 26 is attached on the flap 14.

The pin 26 extends along the second direction Y in the guide slot 24 and passes through the guide slot 24. In other words, the pin 26 extends along a direction parallel to the pivot axis P.

The pin 26 is configured to slide in the guide slot 24.

As shown in FIGS. 1 to 3, the closing device 10 comprises additional pivot link support tabs 27 (not shown) arranged on either side of the guide system 16.

Thus, in this case, the additional pivot links are arranged between each end 14A, 14B of the flap 14 and the guide system 16, in an area of the flap 14 having a deflection smaller than the deflection of the flap portion 14 located in the area of maximum deflection 20.

Such additional pivot links make it possible to accompany the movement of the flap 14 between the open and closed positions and to avoid any blockage of this movement that could for example occur in case of twisting of the flap around itself.

Thus, the additional pivot links make it possible to improve the rotation of the closing flaps 14.

Furthermore, the additional pivot links make it possible to contribute to keeping the closing flaps 14 in position faced with the aerodynamic forces.

The additional pivot links are thus particularly advantageous for a flap 14 of significant length.

During operation, when the closing device 10 is in the closed position, the control module controls the movement of the flaps 14 so that the latter can pivot in their open position.

During the passage from the closed position to the open position, the pin 26 abutting against the closing stop 24C slides in the guide slot 24 along the guide surface 24A until reaching the opening stop 24B.

On the contrary, during the passage from the open position to the closed position, the pin 26 abutting against the opening stop 24B slides in the guide slot 24 along the guide surface 24A until reaching the closing stop 24C.

Thus, the closing flap 14 drives the movement of the pin 26 in the guide slot 24 of the guide system 16. The pivoting of the flap 14 therefore implements the guide system 16, namely the movement of the pin 26 in the guide slot 24.

Thus, the guide system 16 of the closing system 10 is configured to be implemented once the closing flaps 14 pivot, or in other words, during the pivoting of the flap 14.

In a variant, the length of at least two flaps 14 is different and/or the curve of at least two flaps 14 is different.

The position of the curve area 20 of the flaps 14 can also vary.

For example, the position can be defined by the spatial coordinates x, y, z varying respectively along the axes X, Y, Z and a coordinate system O, X, Y, Z whose center O is situated on one end of the support 28.

Also in a variant, the position of the guide slots 24 and pins 26 can vary from one flap 14 to another.

Also in a variant, the position of the opening stop 24B and the closing stop 24C can vary from one closing flap 14 to another.

According to one specific embodiment of the ventilating device 8, the branches 32 each have a weaker portion. The weaker portion is fusible in case of impact with a pedestrian.

In a variant or additionally, the closing flaps 14 have a weaker portion. The weaker portion is fusible in case of impact with a pedestrian.

The ventilating device 8 is improved relative to the known ventilating devices.

Indeed, the guide system 16 forms an additional bearing point for the flaps 14 that contributes to stiffening the entire closing device 10.

The additional bearing point is especially advantageous faced with the aerodynamic forces.

In particular, the additional bearing point notably procures bearing along the direction X in order to limit the deformations of the flaps subject to the aerodynamic forces.

Furthermore, the additional bearing point is also particularly advantageous faced with the indentation forces made by the automobile builders.

Thus, the additional bearing point procured by the guide system 16 between the ends 14A, 14B of the flaps 14 offers a different kinematic of the pivot links 22 and makes it possible to secure the kinematic of the flaps 14.

Furthermore, the guide system 16 makes it possible to reduce the bulk along the first direction X behind the flaps 14.

As a result, the closing device 10 avoids jamming of the movement of the flaps when the flaps 14 are large. Thus, the closing device 10 secures the movement of the flaps 14.

The closing device 10 is especially suitable for large flaps 14.

Furthermore, the closing device 10 is particularly suitable for curved, or in other words, dished, closing flaps 14, because the guide system 16 makes it possible to avoid interference between pivot shaft supports and the flaps 14 as was the case in the state of the art.

Indeed, the closing device 10 makes it possible to replace pivot shaft supports in a central area of the flaps 14, which must have a significant length depending on the deflection in the central area.

Yet, as indicated previously, interference may occur between the flaps 14 and these shaft supports are offset in an area of maximum deflection 20 of the flaps 14.

Thus, the guide system 16 is more compact than pivot systems comprising a pivot shaft support and the parts of the guide system 16 arranged between two adjacent flaps 14 are reduced relative to the additional pivot systems of the ventilating devices 10 of the state of the art.

Thus, the closing device 10 allows the complete rotation of the closing flaps 14 without interference of pivot shaft supports and flaps 14 relative to one another. As a result, the performance of the closing device 10 is improved.

Furthermore, the closing device 10 according to the invention is particularly compact and easier to manufacture. Indeed, a single closing device 10 according to embodiments of the invention in particular suffices when it is incorporated in the grille of the vehicle.

Furthermore, the closing device 10 is adaptable based on the style of the vehicle, and in particular as a function of the desired rendering of the outer skin 18.

Figure 5:
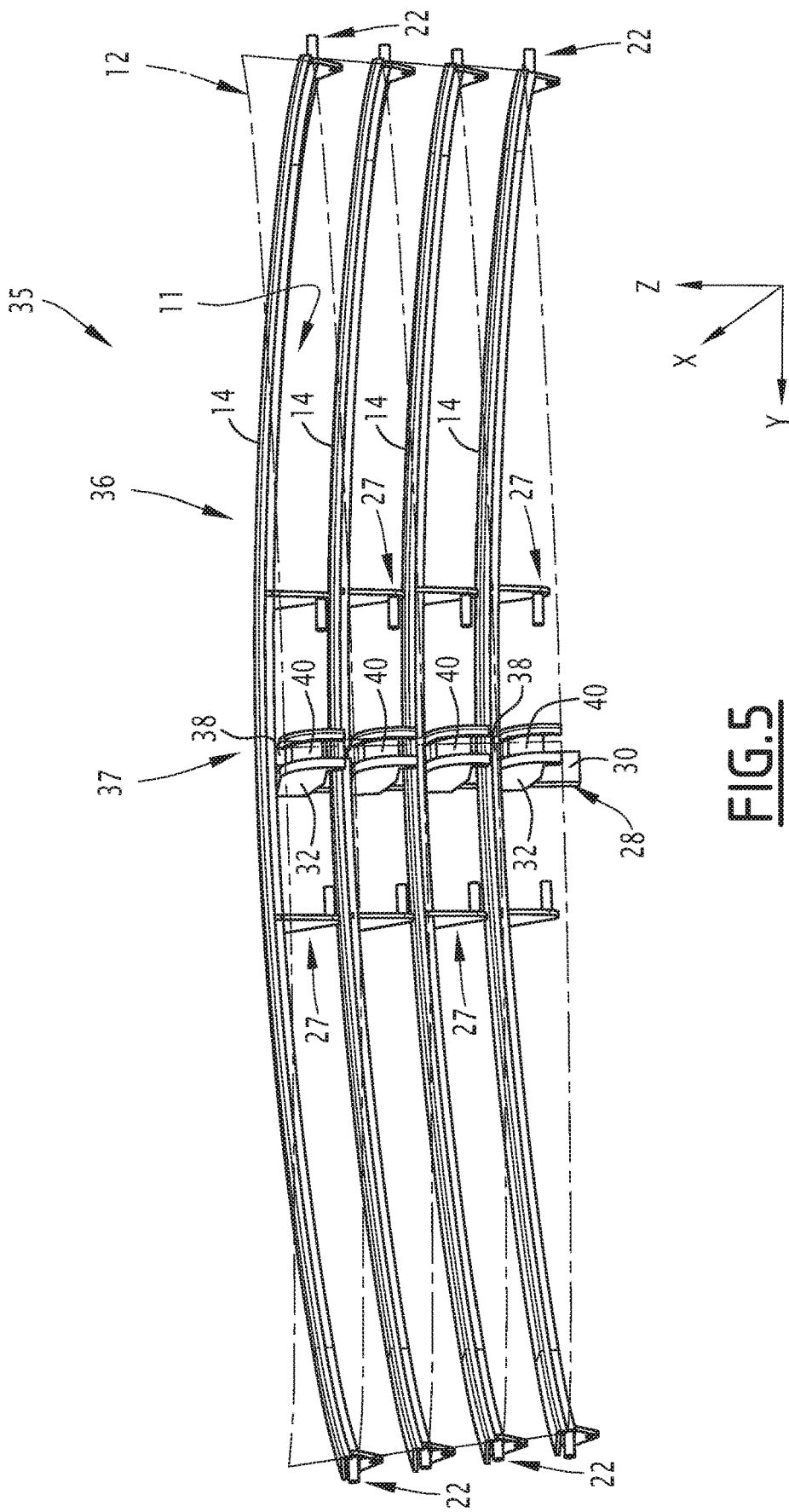
FIG. 5 is a perspective and schematic illustration of the ventilating device in an open position according to another embodiment.
Figure 6:
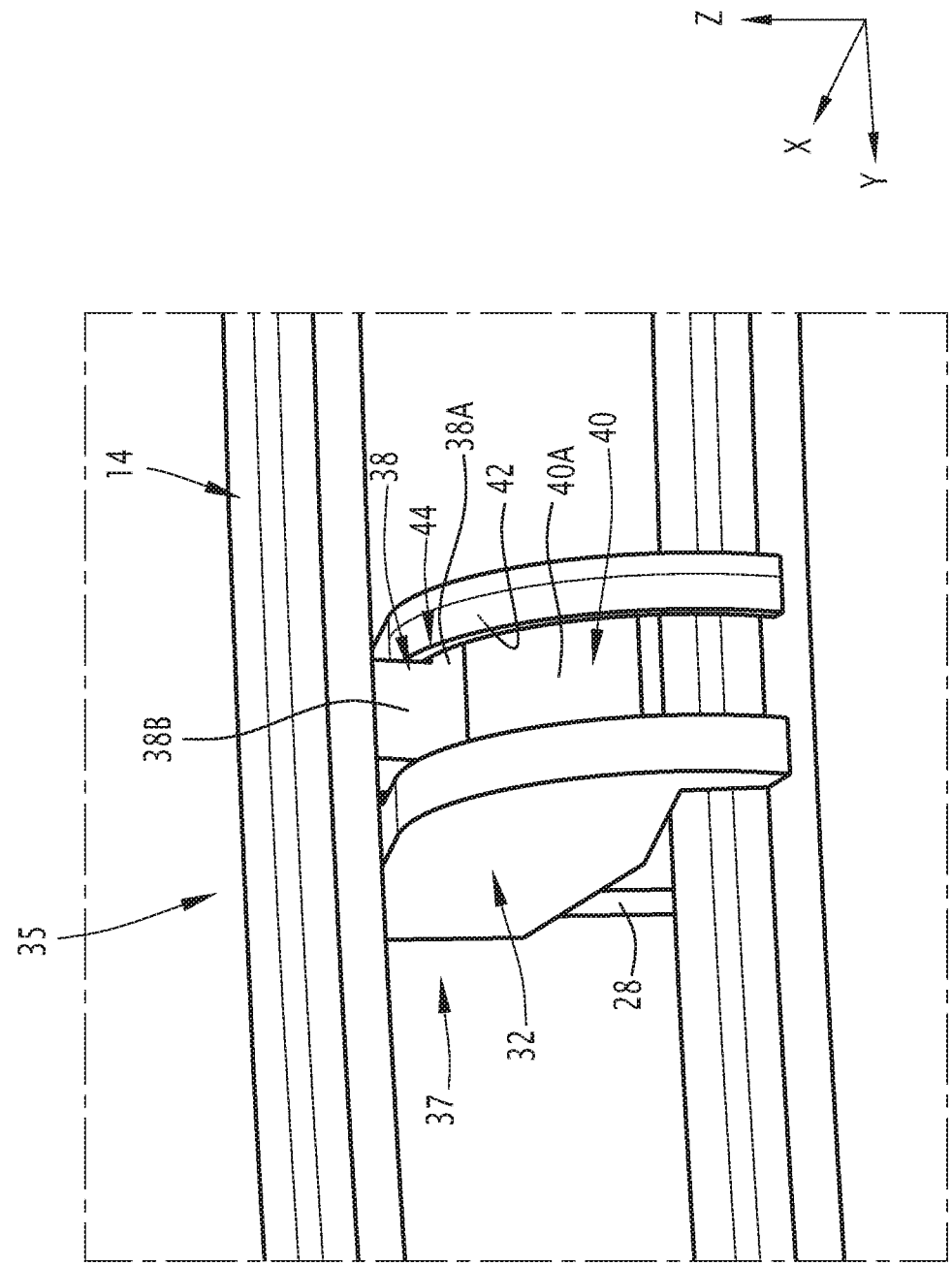
FIG. 6 is a detail perspective view of a closing flap guide system of the ventilating device of FIG. 5.

Another embodiment of the ventilating device is shown in FIGS. 5 and 6.

Only the differences with respect to the embodiment of FIGS. 1 to 4 are disclosed.

Furthermore, the same advantages as those disclosed in reference to the embodiment of FIGS. 1 to 4 apply to this embodiment.

The ventilating device 35 differs from the device of FIGS. 1 to 4 in that it includes a closing device 36 with a different guide system 37.

The pin 38 is in the shape of a mushroom or has a "T" shape.

The pin 38 generally extends along the first direction X, that is to say, substantially perpendicular to the pivot axis P.

The pin 38 has a head 38A and a body 38B secured to the head 38A.

The head 38A of the pin 38 is in contact with the guide surface 40A of the guide slot 40. The body 38B of the pin 38 is fastened to the closing flap 14.

In the present example, the length of the head 38A is greater than the length of the body 38B.

The head 38A and the body 38B are coupled to one another by a shoulder.

In reference to FIG. 5, for each flap 14, the branch 32 delimits the guide slot 40. The guide slot 40 is formed in a thickness of the branch 32. The guide slot 40 includes two walls substantially parallel to one another and substantially normal to the second direction Y.

The shape of the slot 40 is adapted to the shape of the pin 38.

In particular, the guide slot 40 has a first portion 42 configured to receive the head 38A of the pin 38 and a second portion 44 opposite the body 38B of the pin 38.

The first portion 42 has a length greater than the length of the second portion 44.

A shoulder of the guide slot 40 couples the lower portion to the upper portion of the guide slot 40.

The shoulder of the guide slot 40 makes it possible to keep the pin 38 housed in the guide slot 40.

Like in the embodiment disclosed in reference to FIGS. 1 to 4, the guide surface 40A has an opening stop and a closing stop (not visible in the figures).

The mushroom or "T" shape of the pin 38 with the guide slot 40 adapted to the mushroom or "T" shape makes it possible to reduce the possibilities for movement of the closing flaps 14 along the second direction Y and to improve the management of the plays and flushness of the parts of the closing device 36.

Furthermore, the mushroom or "T" shape offers a substantial bearing surface of the pin 38 in the guide slot 40 perpendicular to the air flow when the closing flaps 14 are closed.

The closing devices according to embodiments of the invention then make it possible to reduce the bulk in a central area relative to a conventional device with a pivot shaft.

The closing devices make it possible to move the flaps 14 in a direction combining the first and third directions X, Z thanks to the guide system while avoiding the risks of interference between the flaps 14 and pivot shaft supports as was the case in the state of the art.

In particular, being able to move the flaps 14 along a direction combining the first and third directions X, Z using the pin and the guide slot makes it possible, when the flaps 14 are in the closed position, to obtain a perfect continuity between the environment of the flaps (the bumper skin, for example) and the flaps 14. Thus, the flaps 14 in the closed position are flush with the environment of the flaps 14.

In particular, in the closed position, the guide system procures an additional bearing point for the flaps in order to limit the deformations of the flaps 14 under the aerodynamic forces.

Furthermore, being able to move the flaps in a direction combining the first direction X and third direction Z using the pin and the guide slot makes it possible, when the flaps are in the open position and along the first, second and/or third directions X, Y, Z of the pivot axis P, for the visible ridges of the flaps 14 to be aligned with the environment of the flaps 14 (bumper skin, for example).

In a variant, the flaps 14 may not be aligned with the environment of the flaps 14.

Thus, embodiments of the invention make it possible to position the pivot axis P in a customized manner on a vehicle while reducing the risks of interference with the flaps 14.

Thus, the ventilating device according to embodiments of the invention is adaptable for any type of vehicle.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A ventilating device for ventilating a vehicle, comprising:
   a frame defining an opening; and
   a closing device comprising a closing flap extending in a direction in the opening, the closing device being movable between an open condition and a closed condition such that, when the closing device is in the closed condition, a passage surface for the air through the ventilating device is smaller than the passage surface for the air when the closing device is in the open condition,
   the closing flap being movable between an open position when the closing device is in the open condition and a closed position when the closing device is in the closed condition,
   the closing flap having two ends, each of the ends being pivotably mounted on the frame along a pivot axis substantially parallel to said direction to pivot the closing flap between the open position and the closed position,
   wherein the closing device further comprises a guide system for guiding the closing flap,
   wherein the guide system is arranged between the two ends of the closing flap, and
   wherein the guide system comprises:
      a support, each end of the support being fastened to the frame so that the support is stationary relative to the frame,
      a guide slot having a curved shape, and
      a pin sliding in the guide slot during movement of the closing flap from the open position to the closed position and from the closed position to the open position,
      the pin being fastened to the closing flap and the guide slot being arranged in the support, or the pin being fastened to the support and the guide slot being arranged in the closing flap,
   wherein the closing flap has a curved shape, and
   wherein the closing flap has an area of maximum deflection, the guide system being arranged in said area of maximum deflection of the closing flap.

2. The ventilating device according to claim 1, wherein the support has a weak area such that said area is fusible in case of impact with an element outside the vehicle.

3. The ventilating device according to claim 1, wherein the pin extends along a direction substantially perpendicular to the pivot axis.

4. The ventilating device according to claim 1, wherein the pin extends along a direction parallel to the pivot axis.

5. The ventilating device according to claim 1, wherein ends of the guide slot define an opening stop and a closing stop of the closing flap, the pin being arranged against the opening stop when the closing flap is in the open position and the pin being arranged against the closing stop when the closing flap is in the closed position.

6. The ventilating device according to claim 1, wherein the closing flap is one of a plurality of closing flaps of the closing device, and wherein the guide slot is one of a plurality of guide slots of the guide system and at least two guide slots of the plurality of guide slots are different from one another.

7. The ventilating device according to claim 1, wherein ends of the guide slot respectively define an opening stop and a closing stop of the closing flap, the pin being arranged against the opening stop when the closing flap is in the open position, and the pin being arranged against the closing stop when the closing flap is in the closed position,
   the shape of the guide slot and/or the position of the closing stop and/or the position of the opening stop depending on a maximum deflection of the closing flap.

8. The ventilating device according to claim 1, wherein the pin slides in the guide slot when the closing flap pivots from the open position to the closed position and from the closed position to the open position.

9. A ventilating device for ventilating a vehicle, comprising:
   a frame defining an opening; and
   a closing device comprising a closing flap extending in a direction in the opening, the closing device being movable between an open condition and a closed condition such that, when the closing device is in the closed condition, a passage surface for the air through the ventilating device is smaller than the passage surface for the air when the closing device is in the open condition,
   the closing flap being movable between an open position when the closing device is in the open condition and a closed position when the closing device is in the closed condition,
   the closing flap having two ends, each of the ends being pivotably mounted on the frame along a pivot axis substantially parallel to said direction to pivot the closing flap between the open position and the closed position,
   wherein the closing device further comprises a guide system for guiding the closing flap,
   wherein the guide system is arranged between the two ends of the closing flap, and
   wherein the guide system comprises:
      a support, each end of the support being fastened to the frame so that the support is stationary relative to the frame,
      a guide slot having a curved shape, and
      a pin sliding in the guide slot during movement of the closing flap from the open position to the closed position and from the closed position to the open position,
      the pin being fastened to the closing flap and the guide slot being arranged in the support, or the pin being fastened to the support and the guide slot being arranged in the closing flap,
   wherein the pin extends along a direction substantially perpendicular to the pivot axis.

10. The ventilating device according to claim 9, wherein the closing flap has a curved shape.

11. The ventilating device according to claim 9, wherein the closing flap has an area of maximum deflection, the guide system being arranged in said area of maximum deflection of the closing flap.

12. The ventilating device according to claim 9, wherein the support has a weak area such that said area is fusible in case of impact with an element outside the vehicle.

13. The ventilating device according to claim 9, wherein the closing flap is one of a plurality of closing flaps of the closing device, and wherein the guide slot is one of a plurality of guide slots of the guide system and at least two guide slots of the plurality of guide slots are different from one another.

14. The ventilating device according to claim 9, wherein ends of the guide slot respectively define an opening stop and a closing stop of the closing flap, the pin being arranged against the opening stop when the closing flap is in the open position, and the pin being arranged against the closing stop when the closing flap is in the closed position, the shape of the guide slot and/or the position of the closing stop and/or the position of the opening stop depending on a maximum deflection of the closing flap.

15. A ventilating device for ventilating a vehicle, comprising:

a frame defining an opening; and a closing device comprising a closing flap extending in a direction in the opening, the closing device being movable between an open condition and a closed condition such that, when the closing device is in the closed condition, a passage surface for the air through the ventilating device is smaller than the passage surface for the air when the closing device is in the open condition, the closing flap being movable between an open position when the closing device is in the open condition and a closed position when the closing device is in the closed condition, the closing flap having two ends, each of the ends being pivotably mounted on the frame along a pivot axis substantially parallel to said direction to pivot the closing flap between the open position and the closed position, wherein the closing device further comprises a guide system for guiding the closing flap, wherein the guide system is arranged between the two ends of the closing flap, and wherein the guide system comprises:

a support, each end of the support being fastened to the frame so that the support is stationary relative to the frame, a guide slot having a curved shape, and a pin sliding in the guide slot during movement of the closing flap from the open position to the closed position and from the closed position to the open position, the pin being fastened to the closing flap and the guide slot being arranged in the support, or the pin being fastened to the support and the guide slot being arranged in the closing flap, wherein ends of the guide slot respectively define an opening stop and a closing stop of the closing flap, the pin being arranged against the opening stop when the closing flap is in the open position, and the pin being arranged against the closing stop when the closing flap is in the closed position, the shape of the guide slot and/or the position of the closing stop and/or the position of the opening stop depending on a maximum deflection of the closing flap.

16. The ventilating device according to claim 15, wherein the closing flap has a curved shape.

17. The ventilating device according to claim 15, wherein the closing flap has an area of maximum deflection, the guide system being arranged in said area of maximum deflection of the closing flap.

18. The ventilating device according to claim 15, wherein the support has a weak area such that said area is fusible in case of impact with an element outside the vehicle.

19. The ventilating device according to claim 15, wherein the pin extends along a direction parallel to the pivot axis.

20. The ventilating device according to claim 15, wherein the closing flap is one of a plurality of closing flaps of the closing device, and wherein the guide slot is one of a plurality of guide slots of the guide system and at least two guide slots of the plurality of guide slots are different from one another.

* * * * *